United States Patent
Guillen et al.

(10) Patent No.: US 11,392,643 B2
(45) Date of Patent: Jul. 19, 2022

(54) VALIDATION OF DOCUMENTS AGAINST SPECIFICATIONS FOR DELIVERY OF CREATIVES ON A VIDEO DELIVERY SYSTEM

(71) Applicant: HULU, LLC, Santa Monica, CA (US)

(72) Inventors: Rigoberto Guillen, Brooklyn, NY (US); Prashant Mahesh Patel, Culver City, CA (US); Shih-Kai Lin, Temple City, CA (US); Demian L'Ecuyer, Simi Valley, CA (US)

(73) Assignee: HULU, LLC, Santa Monica, CA (US)

( * ) Notice: Subject to any disclaimer, the term of this patent is extended or adjusted under 35 U.S.C. 154(b) by 120 days.

(21) Appl. No.: 16/885,575

(22) Filed: May 28, 2020

(65) Prior Publication Data

US 2021/0117472 A1    Apr. 22, 2021

Related U.S. Application Data

(60) Provisional application No. 62/924,532, filed on Oct. 22, 2019.

(51) Int. Cl.
| | |
|---|---|
| *G06F 16/00* | (2019.01) |
| *G06F 16/78* | (2019.01) |
| *G06F 16/732* | (2019.01) |
| *G06F 16/783* | (2019.01) |
| *G06F 40/205* | (2020.01) |

(52) U.S. Cl.
CPC ...... *G06F 16/7867* (2019.01); *G06F 16/7343* (2019.01); *G06F 16/7844* (2019.01); *G06F 40/205* (2020.01)

(58) Field of Classification Search
CPC ............ G06F 16/7867; G06F 16/7343; G06F 16/7844; G06F 40/205
See application file for complete search history.

(56) References Cited

U.S. PATENT DOCUMENTS 8,090,839 B2 *   1/2012   Kumar ................ H04L 41/5096
                                                709/227
2002/0056123 A1 *   5/2002   Liwerant ............ H04N 21/4786
                                                725/87

(Continued)

OTHER PUBLICATIONS

Nicholas Bodell. "How to validate your VAST tag?" (Year: 2018).*

(Continued)

*Primary Examiner* — Syed H Hasan
(74) *Attorney, Agent, or Firm* — Kwan & Olynick LLP (57) ABSTRACT

In some embodiments, a method receives a file describing characteristics for delivery of a creative on a video delivery system. The file is queried to identify elements in the string that define metadata. The string is written in a structural language and defines characteristics for the delivery of the creative. The method retrieves tag metadata for tags that define structural elements and validates the tag metadata based on a first specification. Media file metadata is obtained for a media file based on a link to the media file and the media file metadata is validated based on a second specification. The method outputs a result based on the validations. The creative is eligible for insertion during a break of streaming a main video on the video delivery system when the tag metadata and the media file metadata are validated.

20 Claims, 8 Drawing Sheets

(56) References Cited

U.S. PATENT DOCUMENTS

| | | | | |
|---|---|---|---|---|
| 2002/0157111 | A1* | 10/2002 | Reams | H04N 7/17318 |
| | | | | 348/E7.071 |
| 2011/0246500 | A1* | 10/2011 | Chandra | G06F 16/951 |
| | | | | 707/769 |
| 2013/0090986 | A1* | 4/2013 | Casinelli | G06Q 30/0217 |
| | | | | 705/7.32 |
| 2013/0302005 | A1* | 11/2013 | Harwell | H04N 21/2743 |
| | | | | 386/E5.002 |
| 2015/0046938 | A1* | 2/2015 | Qian | H04N 21/2353 |
| | | | | 725/25 |
| 2016/0249085 | A1* | 8/2016 | Ben-Atiya | H04N 21/85406 |
| 2017/0116642 | A1* | 4/2017 | Meyer | G06Q 30/0277 |
| 2017/0279877 | A1* | 9/2017 | Chang | H04L 67/101 |
| 2018/0365250 | A1* | 12/2018 | Maharajh | G06F 16/957 |
| 2019/0215556 | A1* | 7/2019 | Nugent | H04N 21/26258 |
| 2020/0204847 | A1* | 6/2020 | Lykes | H04N 21/2407 |
| 2020/0234342 | A1* | 7/2020 | Santiago | G06Q 30/0267 |

OTHER PUBLICATIONS

Cross-Origin Resource Sharing (CORS)—HTTP MDN, https://developer.mozilla.org/en-US/docs/Web/HTTP/CORS, May 27, 2020.

"Ffmpeg Documentation," https://ffmpeg.org/ffmpeg.html; May 27, 2020.

Ffprobe Documentation,https://ffmpeg.org/ffprobe.html, May 27, 2020.

Lab.Tech Lab, "Video Ad Serving Template", Version 4.2, Released Jun. 2019.

\* cited by examiner

VALIDATION OF DOCUMENTS AGAINST SPECIFICATIONS FOR DELIVERY OF CREATIVES ON A VIDEO DELIVERY SYSTEM

CROSS REFERENCE TO RELATED APPLICATIONS

Pursuant to 35 U.S.C. § 119(e), this application is entitled to and claims the benefit of the filing date of U.S. Provisional App. No. 62/924,532 filed Oct. 22, 2019, the content of which is incorporated herein by reference in its entirety for all purposes.

BACKGROUND

During video streaming of videos (e.g., a program, movie, show, etc.), a video delivery service may insert creatives, such as advertisements from third parties. To integrate the creatives into videos being streamed by the video delivery service, the video delivery service may define certain specifications should be met by video for the creatives. In some cases, a template or specification, such as Video Ad Serving Template (VAST), is used to define the creative to be inserted during the streaming of the videos. The advertiser may describe the creative using an extensible markup language (XML) format that is defined by Interactive Advertising Bureau (IAB) VAST guidelines. The advertiser may generate the XML document that describes the creative using VAST tags with associated data. Typically, the format may include some problems based on the VAST guidelines or other requirements that are set by other companies. In this case, a back and forth between the video delivery service and the advertiser occurs to correct the problems with the XML document. This may be a time-consuming process and involve manual steps and resources.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a validation system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

A video delivery service may offer videos (referred to as "main videos") on its platform for streaming to client devices. At different times, the video delivery service may serve creatives before, during, after, or in between the streaming of the main videos. In some embodiments, the creatives are offered by separate entities (e.g., third parties) from the video delivery service, such as from advertisers that are offering the advertisements. The advertisements may be videos that are played during breaks for the main video being played.

The specification for delivery of the creative may be defined by a structured language, such as extensible markup language (XML), and be in a format as defined by a template or specification, such as the IAB VAST guidelines. However, other templates, protocols, or specifications may be used to define the structured document. A structured document may include tags that define the structure of the document, and the tags have associated data. The associated data defines characteristics for the delivery of the creative by the video delivery service.

Before a creative can be served to a client device, the video delivery service automatically validates that the creative meets requirements set by the video delivery service. A verification service may validate the tags in the structured document for the creative and the associated data for the tags based on requirements included in a specification defined by the video delivery service. In some embodiments, the verification service may validate tags in the structured document along with the data contained in those tags. Also, the verification service may validate any media files that are referenced in links found in the structured document. For example, multiple media files may be validated at once. The media files may include the videos that should be played during breaks in the main video. The validation of a media file may include validating the metadata for the media file. Then, once the validation checks have passed, the video delivery service may ingest the media files before serving the creatives.

System Overview

Figure 1:
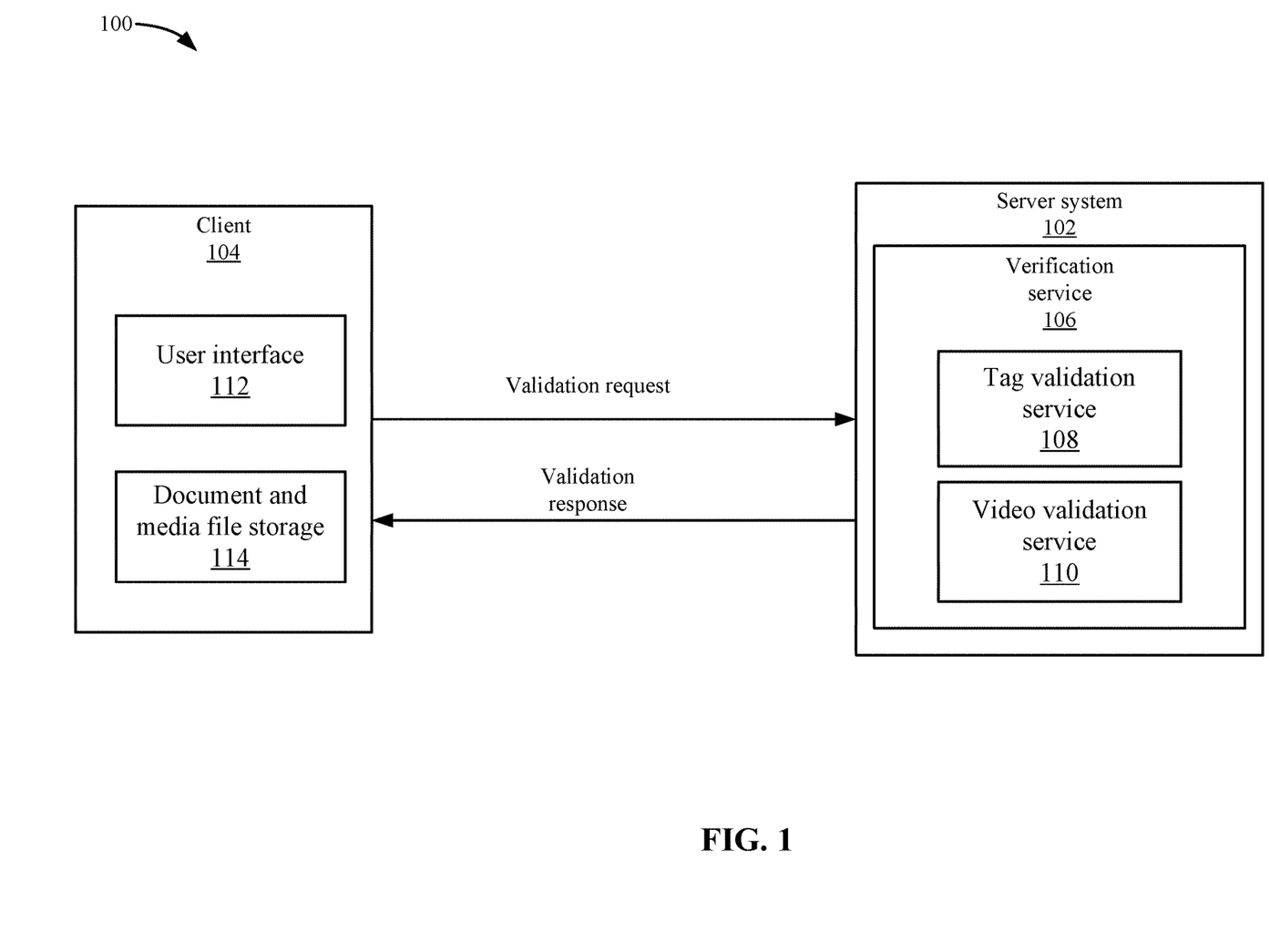
FIG. 1 depicts a simplified system for validating creatives according to some embodiments.

FIG. 1 depicts a simplified system 100 for validating creatives according to some embodiments. System 100 includes a server system 102 and a client 104. Server system 102 is associated with a video delivery system that allows users to stream main videos. The main videos may be live television and/or on-demand videos, such as programs, movies, sporting events, shows, etc. Server system 102 may also provide a verification service 106 that verifies creatives that may be served (e.g., sent, streamed, downloaded, etc.) in addition to the main videos.

The creatives may be videos that may be served during breaks, such as advertisement breaks before, during, and after the main videos are streamed. Also, the creatives do not need to be served during breaks of a main video, but may be served at other times, such as when a user is browsing an interface. As described above, a creative may be an advertisement that is offered by a third party that is different from the video delivery system.

The creatives may be defined by a document that is in a specified format, such as defined by VAST. However, other formats may be used. The document may be in a structured format, which includes tags that define the structure of the document. Data may be associated with those tags. A tag may be an identifier that describes elements in a schema for the format. In some embodiments, the creative is defined in a VAST XML, format. The document may also define media files that include the videos to be played for the creative.

Verification service 106 includes a tag validation service 108 that validates the tags in the document for the creative along with the data associated with the tags. Validating the data for the tags is different from verifying the tag format or the absence or presence of tags. This process will be discussed in more detail below.

Verification service 106 also includes a video validation service 110 that validates any media files associated with any of the tags. For example, links to the media file, such as uniform resource locators (URLs), may be included in data for the tags. Video validation service 110 may locate references to the media files in the tags and determine metadata for the media files. Video validation service 110 may then validate the media files. This process will be described in more detail below.

The above validation process may be automated. For example, the third party may use client 104 to upload a document that defines a creative, such as user interface 112 may be used to upload the document. User interface 112 then submits a validation request for the document to server system 102. The document may be stored in storage, such as document and media file storage 114. User interface 112 retrieves the document from storage 114 and uploads the document to server system 102.

Verification service 106 can then validate the document. For example, verification service 106 validates the tags and associated data for the tags in addition to any media files referenced by the data for the tags. After verification service 106 validates the tags, associated data, and the media files, verification service 106 may send a validation response. The response may indicate the document has been validated or invalidated. If validated, client 104 may upload any media files for the document for ingestion to server system 102. For example, user interface 112 may be used to submit the media file, which may be retrieved from storage 114. Server system 102 may then ingest the media file and perform any operations on the media file that are needed, such as transcoding. If invalidated, the invalidation may list one or more requirements that were not met and include any other information needed to remediate the problem. The third party may alter the document or media file and resubmit the request for validation.

Verification Service

Figure 2:
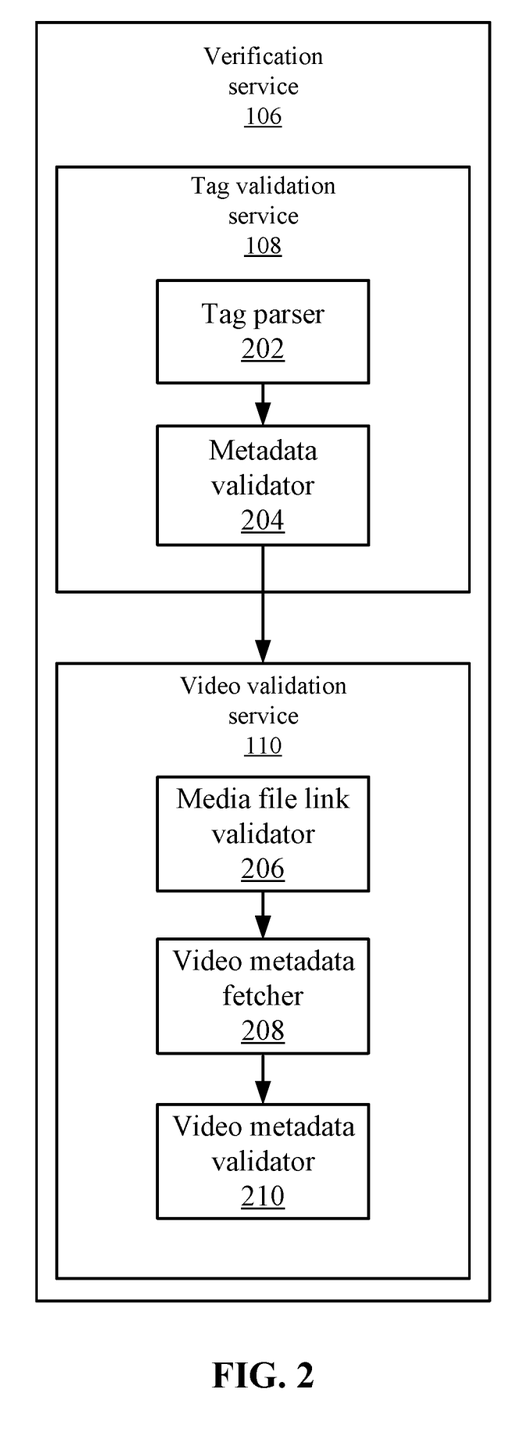
FIG. 2 depicts a more detailed example of a verification service according to some embodiments.

FIG. 2 depicts a more detailed example of verification service 106 according to some embodiments. Verification service 106 may perform the validation in real-time. That is, the validation request is submitted, processed, and a validation result is provided within a time limit while a user is still using the interface (e.g., within seconds and below a minute).

Tag validation service 108 validates the tags included in the document for the creative. A tag parser 202 may parse the document and determine the tags found in the document. Then, tag parser 202 may retrieve metadata for the tags, which may be data associated with the tags in the document.

Then, a metadata validator 204 validates the format of the tags and the metadata against a requirement defined in a specification. The specification may be defined by the video delivery service. The tag validation is described in more detail below.

If the tags and the metadata for the tags are validated, video validation service 110 may validate any media files found in the document. A media file link validator 206 determines the links, such as URLs, in the document. In some embodiments, there may be redirections for the link, which redirects between multiple sites, and ultimately redirects to a link in which the media file can be retrieved. Media file link validator 206 may follow the redirections to determine a link in which the media file can be downloaded.

A video metadata fetcher 208 may then obtain metadata for the video. The metadata may include encoding information (e.g., a codec version), width, height, aspect ratio, bitrate, and other characteristics for the video.

Video metadata validator 210 then validates the metadata against requirements defined by the video delivery system. In some embodiments, video metadata validator 212 may be able to validate any kind of video metadata. In some examples, if the third party wants to validate the video file metadata using a defined format, the third party may submit a customized file defining the format of the video file metadata. For example, verification service 106 may provide guidelines to the third party as to what requirements can be defined and within which values. The third party can then define the specific requirements within the guidelines. Allowing the third parties to define requirements within the specification is important because different organizations have different requirements (specifications) they validate against. For example, ads videos have different bitrate requirements from content (an episode or movie), and video metadata validator 210 is flexible to accommodate both use cases. For example, the file may define the format of the metadata. Then, video metadata validator 212 may determine the metadata and then compare the metadata to the requirements defined by the video delivery system.

Tag Validation

Figure 3:
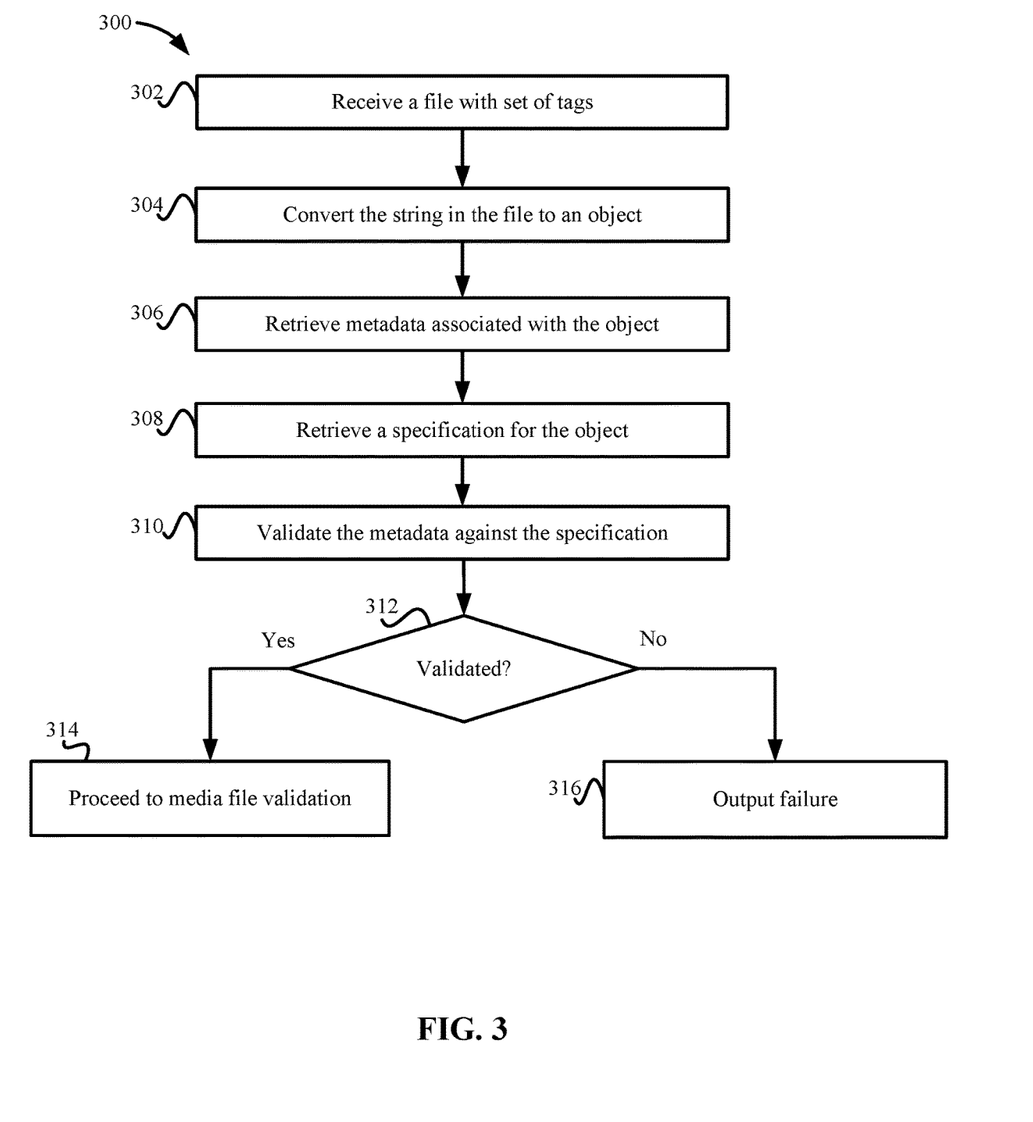
FIG. 3 depicts a simplified flowchart of a method for validating tags according to some embodiments.

FIG. 3 depicts a simplified flowchart 300 of a method for validating tags according to some embodiments. At 302, tag validation service 108 receives a file with a set of tags. As discussed above, the file may be in a structured format, include one or more tags with associated data, and one or more links to media files. The structured format may be a string that defines the tags and associated data for the tags. At 304, tag validation service 108 converts the string in the file to an object in which fields in the string can be queried. In some embodiments, tag validation service 108 maps the file that includes the XML data to another object-based format, such as a JAVA™ class format. In this way, tag validation service 108 can unmartial the XML to a java object. The object may define fields from the string that can be queried. Other methods may use a query language to query nodes in the string. Performing the above process allows tag validation service 108 to convert an XML string into an object.

Then, at 306, tag validation service 108 retrieves metadata associated with the object. For example, the metadata may be list with identifiers. One example of metadata in the object is:

width="600"
type="video/x-flv"
height="396"
delivery="progressive"
bitrate="496"
mediaFileUrl="http://YYY.com/ads/partner1_ecdf0740-75b9-40ef-b4d6-06cf03306c8e.flv"

The metadata associated with the object may include a format of the width of the video, the type of the video, the height of the video, the delivery type, the bitrate, and the URL to retrieve the advertisement. Other types of metadata may be the VAST version, ad impression links, ad tracking links, video click links, media file links, etc. The format of VAST version may be the version of VAST being used, the ad tracking links may be links that are used to track the creative being played, video click links are links that are used to track selection of the creative being played, the media file links are links to the media files for the creative, a type of media file may be an encoding version of the media file or other characteristics of the video.

At 308, tag validation service 108 may select a specification for the object. The specification may be defined for the creative or may be a universal specification that includes requirements for multiple creatives that are submitted to the video delivery system.

At 310, tag validation service 108 validates the metadata against the specification that is being used. In some embodiments, the object is validated by verifying that the format used, such as the VAST version, as a valid format. Then, if the format is the correct version, tag validation service 108 verifies other parameters, such as verifying that the creatives exist in the document, verifying that the ad impression links exist, verifying that the ad tracking links exist, verifying that the video click links exist, verifying media file links exist, and verifying that the type of media file supported. Other verifications may also be appreciated. Verifying that the format is a valid format may be verifying the version of the format is supported, such as a version 1.0, 2.0, 3.0, etc. Verifying that the creatives exist in the object verifies that links to the media file exist, and verifying the ad impression links, ad tracking links, video click links, and/or media file links verifies that the object includes the required links, the width and height, bitrate, frame rate, aspect ratio, etc.

At 312, tag validation service 108 determines if the metadata is validated. If validated, at 316, the process proceeds to the media file validation process. However, if invalid, at 318, tag validation service 108 outputs a message that the document was invalid. At this point, the third party may communicate with the video delivery system to determine the cause of the failure. Alternatively, tag validation service 108 may output the reason for the failure and the third party can alter the document and resubmit the document.

Media File Validation

Figure 4:
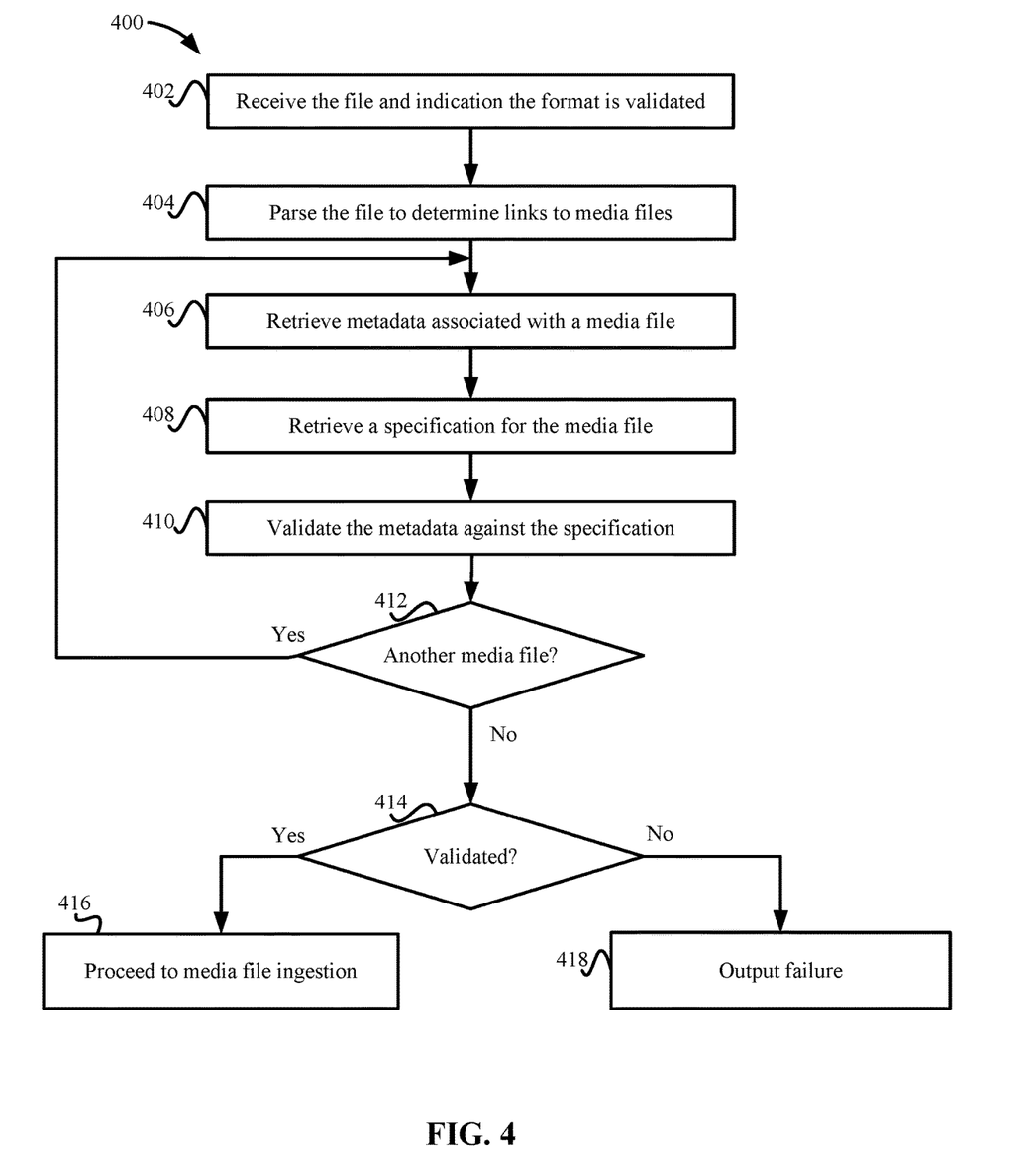
FIG. 4 depicts a simplified flowchart of a method for validating media files in a document according to some embodiments.

FIG. 4 depicts a simplified flowchart 400 of a method for validating media files in a document according to some embodiments. At 402, video validation service 110 receives the file and the indication that the format is verified.

At 404, video validation service 110 parses the file to determine links to media files. The links to media files may be associated with data for tags in the file. For example, a parameter may identify a media file, such as the parameter <MediaFiles>. This parameter may have one or more entries where each entry may identify a media file.

At 406, video validation service 110 retrieves metadata associated with a media file. For example, the file may include links to multiple media files. Video validation service 110 may validate each media file. To retrieve metadata for a media file, video validation service 110 may follow the link, and any other links associated with the link, such as redirections, to determine the media file. In some embodiments, video validation service 110 determines the media file at the last redirection from the links. Video validation service 110 may then download the media file from the link. The downloaded media file may include metadata, and video validation service 110 retrieves the metadata associated with the media file. The metadata may include the codec name, the width of the video, the height of the video, the aspect ratio, etc.

At 408, video validation service 110 retrieves a specification for the media file. The specification may be defined for that specific media file or may be used for multiple media files. The specification may include a list of requirements for media files that are required to play the media file on the video delivery system. In some embodiments, the specification may be stored in a file that is in a format, such as JavaScript Object Notation (JSON), that allows the comparison of metadata from multiple media files to the specification. The use of the domain-specific language for validating the media file metadata allows the requirements to be inserted and easily changed by users. For example, if the criterion for the bitrate for a video is greater than 15 megabytes per second (Mbps) (>15 Mbps), or if it is decided that the range should be 15-20 Mbps, then changing the criterion does not require a code change. Rather, the requirement in the domain-specific language can be changed. Also, the domain-specific language may allow for specification of other text or wild cards, such as the codec tag could be in the exact name of "H.264" or could be changed to a pattern of "H*.264". This may allow for slight verifications in the metadata specified for media files. That is, different kinds of metadata may be validated to the specification.

At 410, video validation service 110 validates the metadata against the specification. For example, the validation may validate that the codec name is a specific codec version, such as H.264. Media file validation may also validate that the width is greater than or equal to number of pixels, such as "1200", or that the height of the video is greater than or equal to number of pixels, such as "720". The validation also may validate the sample aspect ratio with a value, such as "1:1" or the display aspect ratio is a ratio, such as "4:3" or "16:9". Other validations for the video may also be determined.

At 412, video validation service 110 determines if there is another media file referenced by a link in the file. If there is another media file, the process reiterates to 406 to process the metadata for another media file.

If there are no other media files, at 414, video validation service 110 determines if the media files have been validated in a file. If validated, at 416, the process proceeds to media file ingestion, which may download the media files. In some embodiments, the ingestion may be performed in real time. For example, the media files may be downloaded and then converted to the format needed to deliver the media files to the video delivery system. For example, the media files may be transcoded to different formats, such as different bitrates.

If one or more of the media files is invalid, at 418, video validation service 110 outputs a failure message. The failure message may output a reason for the failure, such as certain requirements have not been met. At this point, the third party may adjust the format of the media file and resubmit the request.

File Format

Figure 5:
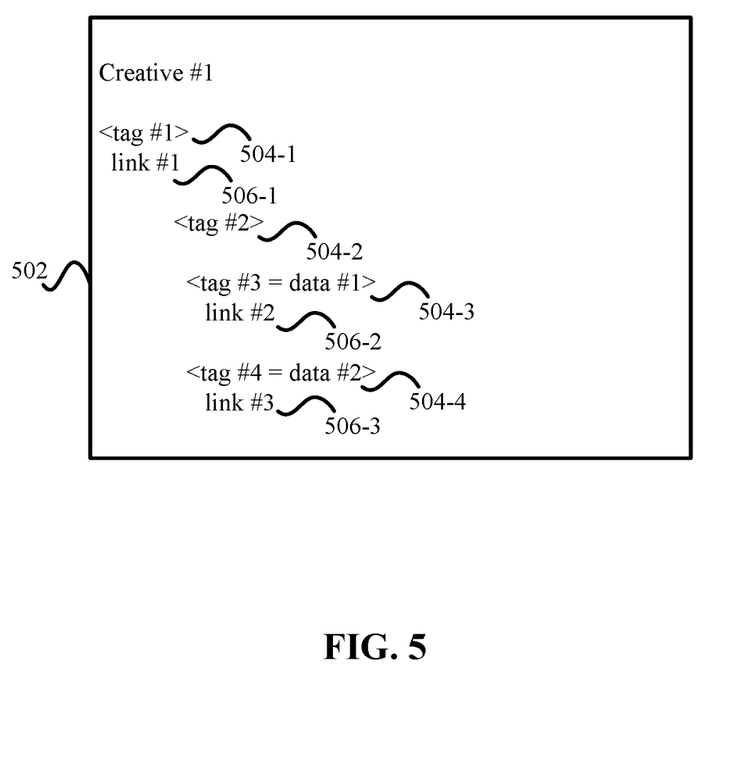
FIG. 5 depicts an example of a document for a creative according to some embodiments.

FIG. 5 depicts an example of a document for a creative according to some embodiments. Document 502 describes characteristics for delivery of a creative #1 and includes tags 504 and links 506. It is noted that document 502 is a simplified version and other information may be included in document 502.

A first tag 504-1 may be for a first type of tag, such as an impression tag. The impression tag includes a link #1 at 506-1 that defines a link to be used when an impression occurs.

At 504-2, a tag #2 identifies another type of tag, such as tracking events. The tag for tracking events also includes data. For example, at 504-3 and 504-4, a tag #3 and a tag #4 have associated data #1 and data #2 respectively. In some embodiments, the tags may define tracking events with data, such as data of "start", "first quartile", "midpoint", etc. Tag #3 includes a link #2 at 506-2 that defines a link for the tag. A link #3 at 506-3 defines a link for tag #4. The links may be associated with media files or may be links to activate when an event occurs, such as video click links, ad tracking links, etc.

Creative Playback

Figure 6:
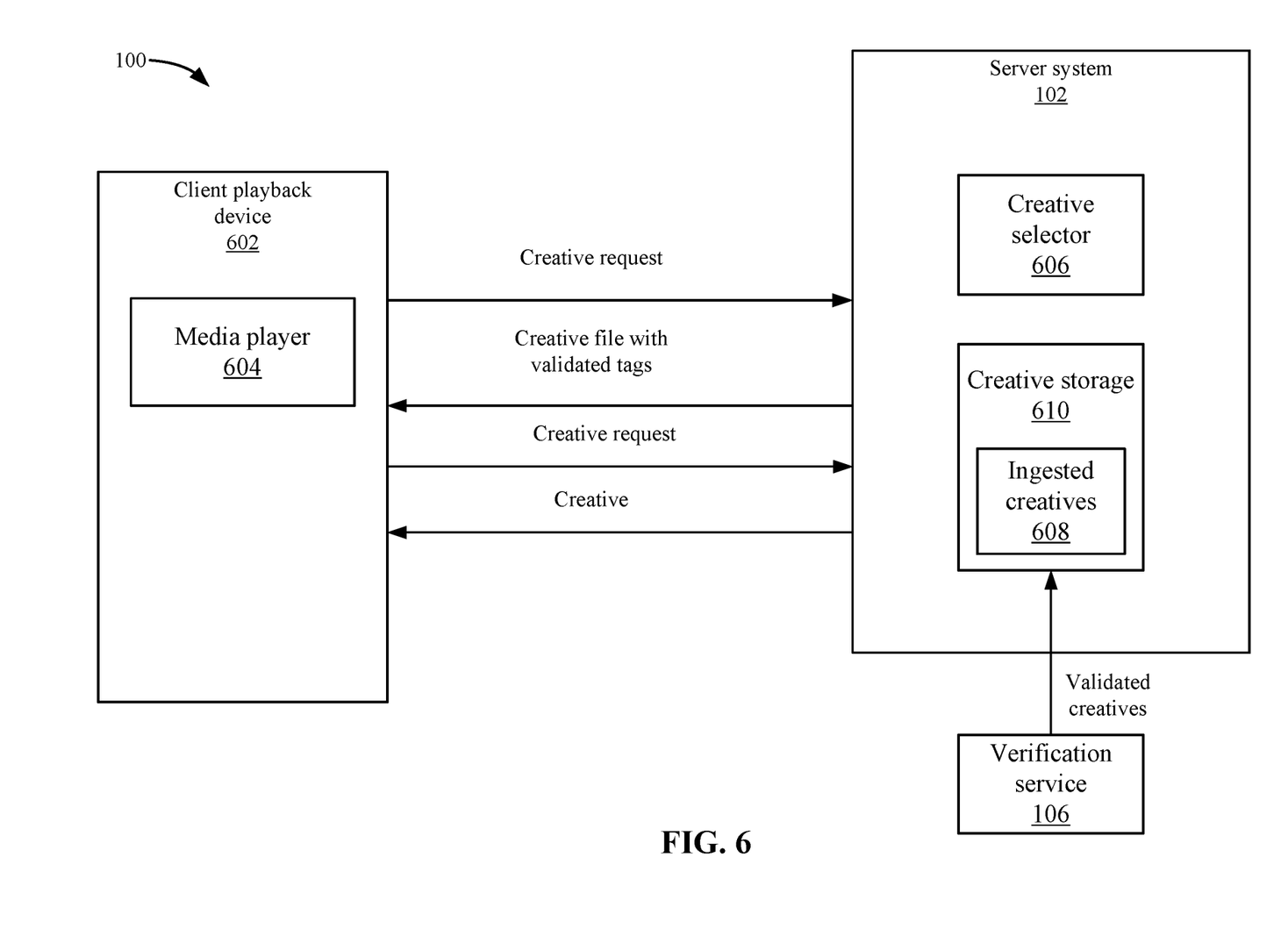
FIG. 6 depicts an example of the playback of creatives according to some embodiments.

FIG. 6 depicts an example of the playback of creatives according to some embodiments. A client playback device 602 may be playing a main video offered by the video delivery system. During playback, creatives may be inserted. When this occurs, a media player 604 that was playing the main video may send a creative request to server system 102. In some embodiments, media player 604 sends the creative request to an ad server. The ad server may be a different system than the system that performed the validation Once the creative request is received, a creative selector 606 selects a creative. For example, logic may be used to select a creative based on the playback, such as the characteristics of a profile being associated with a user watching the main video.

Server system 102 includes ingested creatives 608 that have been ingested from validated media files. The media files may have been converted per the specifications of the video delivery system. Also, verification service 106 may store the validated creatives to a creative storage 610. Creative storage 610 may list the validated creatives that are available for selection. Creative selector 606 may select one of the creatives. Then, creative selector 606 sends a creative file with validated tags. That is, the file that is sent may have been validated using the process above such that the tags, data, and associated media files listed in a file have been validated.

Media player 604 uses the creative file to submit a creative request at the appropriate time. In some examples, the creative request may request a media file. Also, media player 604 may actuate links when events occur according to the tags in the creative file, such as when an impression occurs, a video click occurs, etc. When a media file should be played, media player 604 submits a creative request, such as by sending a request to a media file link in the creative file. The request may be sent to any server storing the creative. In some embodiments, server system 102 may then retrieve the creative and serve the creative to media player 604 for playback.

Conclusion

Accordingly, verification service 106 offers an automated validation of creatives that can validate the tags in a file in addition to the data associated with the tags. The media files associated with links in the file are also validated. This provides an automated process that can allow a third party to provide a file and have creatives validated for delivery on the video delivery system. This removes manual processes, which makes the validation process more efficient.

Example Embodiments

In some embodiments, a method comprising: receiving, by a computing device, a file describing characteristics for delivery of a creative on a video delivery system; parsing, by the computing device, the file to identify a string found in the file, wherein the string is written in a structural language and defines characteristics for the delivery of the creative; querying, by the computing device, elements in the string that define metadata; retrieving, by the computing device, tag metadata for a set of tags that define structural elements in the string for the creative; validating, by the computing device, the tag metadata based on a first specification, wherein the first specification lists requirements for the tag metadata; obtaining, by the computing device, media file metadata for a media file based on a link to the media file in the file; validating, by the computing device, the media file metadata based on a second specification, wherein the second specification lists requirements for the media file metadata; and outputting, by the computing device, a result based on the validation of the tag metadata and based on the validation of the media file metadata, wherein the creative is eligible for insertion during a break of streaming a main video on the video delivery system when the tag metadata and the media file metadata are validated.

In some embodiments, retrieving the tag metadata for the set of tags comprises: converting the string to an object that defines the set of tags as fields in the object; and parsing the tag metadata for the set of tags from the object.

In some embodiments, validating the tag metadata based on the first specification comprises: comparing tag metadata for a tag in the set of tags to a requirement for the tag from the first specification.

In some embodiments, validating the tag metadata based on the first specification comprises: outputting a message indicating a validation of the tag metadata for the tag when the requirement for the tag from the first specification is met; and outputting an invalidation for the tag metadata for the tag when the requirement for the tag from the first specification is not met.

In some embodiments, the method further comprising: determining the link to the media file in the string; and downloading the media file using the link.

In some embodiments, downloading the link comprises: following a redirection for the link to determine the media file.

In some embodiments, the media file is retrieved at a last redirection from the link.

In some embodiments, obtaining the media file metadata for the media file comprises: retrieving media file metadata describing characteristics of playback of the media file.

In some embodiments, validating the media file metadata based on the second specification comprises: comparing media file metadata to a requirement from the second specification.

In some embodiments, the requirement is written in a domain specific language that allows comparison to different formats of media file metadata.

In some embodiments, the method further comprising: when the result of the validation of the tag metadata and the validation of the media file metadata is valid, ingesting the media file.

In some embodiments, ingesting the media file comprises: receiving the media file; and performing an operation on the media file to prepare the media file for playback.

In some embodiments, the method further comprising: obtaining additional media file metadata for additional media files in the file; validating the additional media file metadata based on the second specification; and outputting, by the computing device, a result of the validation of the media file metadata.

In some embodiments, the method further comprising: providing the creative for selection during a break while playing a video, wherein the media file is played back during the break when the creative is selected.

In some embodiments, the file describing characteristics for delivery the creative on a video delivery system is received at an ad server during streamlining of the main video in which the creative is to be inserted.

In some embodiments, the method further comprising: converting the string to an object that defines the metadata as fields in the object, wherein the fields define the tag metadata and the media file metadata.

In some embodiments, a non-transitory computer-readable storage medium containing instructions, that when executed, control a computer system to be operable for: receiving a file describing characteristics for delivery a creative on a video delivery system; parsing the file to identify a string found in the file, wherein the string is written in a structural language and defines characteristics for the delivery of the creative; querying elements in the string that define metadata; retrieving tag metadata for a set of tags that define structural elements in the string for the creative; validating the tag metadata based on a first specification, wherein the first specification lists requirements for the tag metadata; obtaining media file metadata for a media file based on a link to the media file in the file; validating the media file metadata based on a second specification, wherein the second specification lists requirements for the media file metadata; and outputting a result based on the validation of the tag metadata and based on the validation of the media file metadata, wherein the creative is eligible for insertion during a break of streaming a main video on the video delivery system when the tag metadata and the media file metadata are validated.

In some embodiments, the instructions are further operable for: determining the link to the media file in the object; and downloading the media file using the link.

In some embodiments, the instructions are further operable for: when the result of the validation of the tag metadata and the validation of the media file metadata is valid, ingesting the media file.

In some embodiments, an apparatus comprising: one or more computer processors; and a non-transitory computer-readable storage medium comprising instructions, that when executed, control the one or more computer processors to be operable for: receiving a file describing characteristics for delivery of a creative on a video delivery system; parsing the file to identify a string found in the file, wherein the string is written in a structural language and defines characteristics for the delivery of the creative; querying elements in the string that define metadata; retrieving tag metadata for a set of tags that define structural elements in the string for the creative; validating the tag metadata based on a first specification, wherein the first specification lists requirements for the tag metadata; obtaining media file metadata for a media file based on a link to the media file in the file; validating the media file metadata based on a second specification, wherein the second specification lists requirements for the media file metadata; and outputting a result based on the validation of the tag metadata and based on the validation of the media file metadata, wherein the creative is eligible for insertion during a break of streaming a main video on the video delivery system when the tag metadata and the media file metadata are validated.

System

Figure 7:
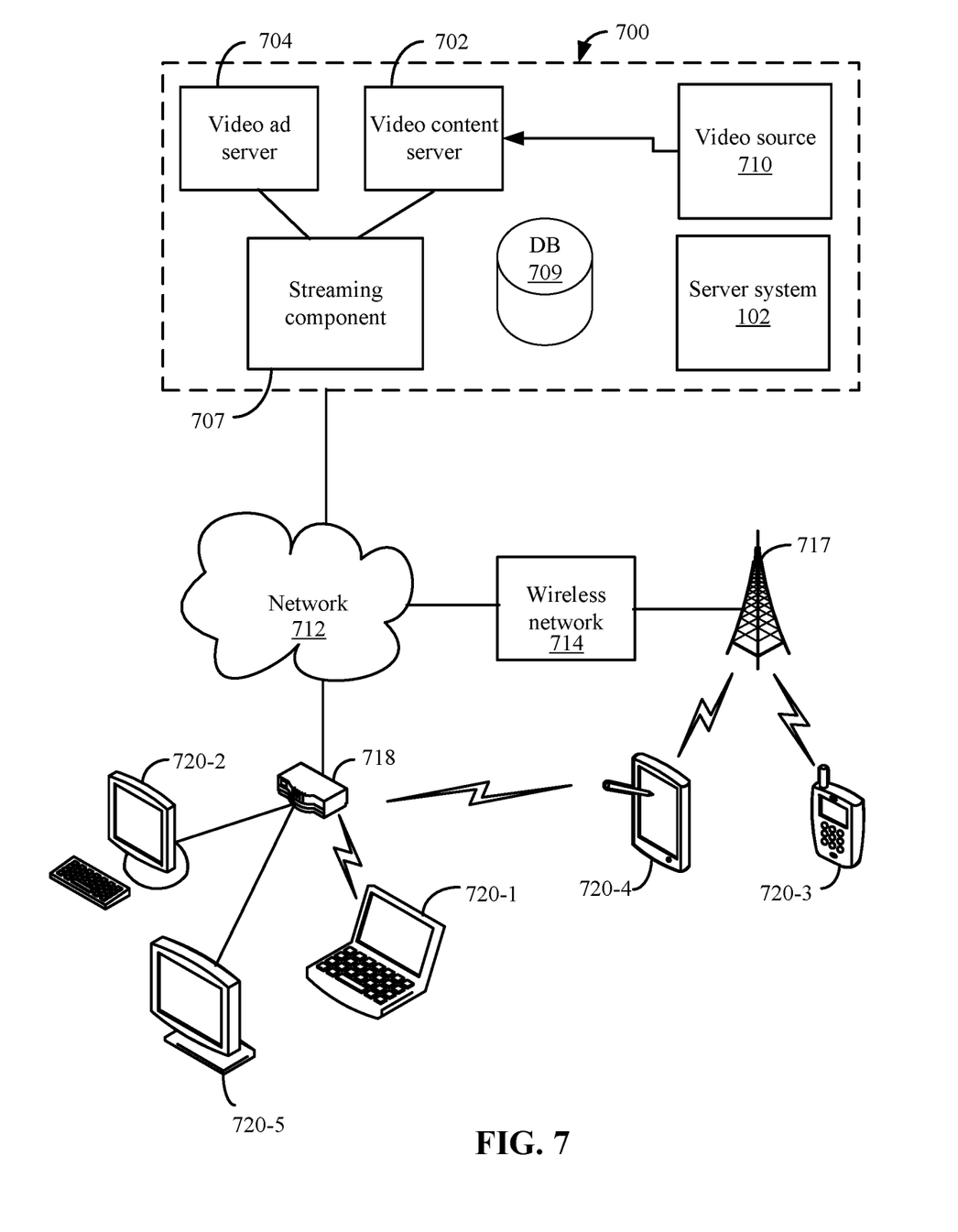
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include server system 102.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
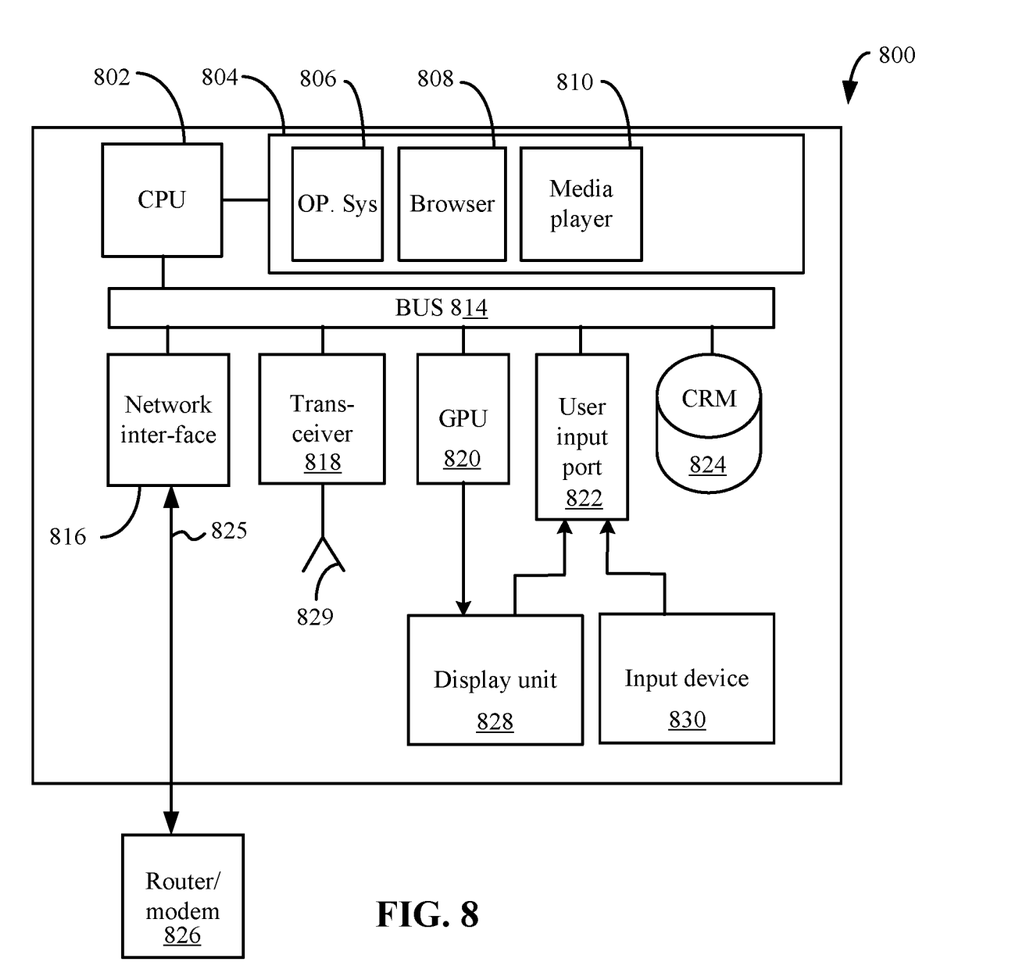
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device, a file describing characteristics of a creative for delivery on a video delivery system;

parsing, by the computing device, the file to identify a string found in the file, wherein the string is written in a structural language and defines characteristics for the delivery of the creative;

validating, by the computing device, tag metadata for a set of tags that define structural elements in the string for the creative based on a first specification, wherein the first specification lists requirements for the tag metadata;

in response to receiving an indication the tag metadata is validated, parsing, by the computing device, the file to determine a link for a media file, wherein the link is determined from the string;

following, by the computing device, the link to obtain media file metadata for the media file;

validating, by the computing device, the media file metadata based on a second specification, wherein the second specification lists requirements for the media file metadata; and outputting, by the computing device, a result based on the validation of the tag metadata and the validation of the media file metadata; and when the tag metadata and the media file metadata are validated, converting, by the computing device, the media file to a format per a third specification of the video delivery system, wherein the creative is eligible for insertion during a break of streaming a main video on the video delivery system.

2. The method of claim 1, further comprising:
converting the string to an object that defines the set of tags as fields in the object; and
parsing the tag metadata for the set of tags from the object.

3. The method of claim 1, wherein validating the tag metadata based on the first specification comprises:
comparing tag metadata for a tag in the set of tags to a requirement for the tag from the first specification.

4. The method of claim 3, wherein validating the tag metadata based on the first specification comprises:
outputting a message indicating a validation of the tag metadata for the tag when the requirement for the tag from the first specification is met; and
outputting an invalidation for the tag metadata for the tag when the requirement for the tag from the first specification is not met.

5. The method of claim 1, wherein following the link to obtain the media file comprises:
downloading the media file using the link.

6. The method of claim 5, wherein following the link comprises:
following a redirection for the link to determine the media file.

7. The method of claim 6, wherein the media file is retrieved at a last redirection from the link.

8. The method of claim 1, wherein the media file metadata describes characteristics of playback of the media file.

9. The method of claim 1, wherein validating the media file metadata based on the second specification comprises:
comparing media file metadata to a requirement from the second specification.

10. The method of claim 9, wherein the requirement is written in a domain specific language that allows comparison to different formats of media file metadata.

11. The method of claim 1, further comprising:
when the result of the validation of the tag metadata and the validation of the media file metadata is valid, ingesting the media file.

12. The method of claim 11, wherein ingesting the media file comprises:
receiving the media file; and
performing an operation on the media file to prepare the media file for playback.

13. The method of claim 1, wherein the media file comprises a first media file, the media file metadata comprises first media file metadata, and the link comprises a first link, the method further comprising:
parsing the file to determine a second link for a second media file;
obtaining second media file metadata for second media file;
validating the second media file metadata based on the second specification; and
outputting, by the computing device, a result of the validation of the second media file metadata.

14. The method of claim 1, further comprising:
providing the creative for selection during a break while playing a video, wherein the media file is played back during the break when the creative is selected.

15. The method of claim 1, wherein the file is received at an ad server during delivery of the main video in which the creative is to be inserted.

16. The method of claim 1, further comprising:
converting the string to an object that defines the metadata as fields in the object, wherein the fields define the tag metadata and the media file metadata.

17. A non-transitory computer-readable storage medium containing instructions, that when executed, control a computer system to be operable for:
receiving a file describing characteristics of a creative for delivery on a video delivery system;
parsing the file to identify a string found in the file, wherein the string is written in a structural language and defines characteristics for the delivery of the creative;
validating tag metadata for a set of tags that define structural elements in the string for the creative based on a first specification, wherein the first specification lists requirements for the tag metadata;
in response to receiving an indication the tag metadata is validated, parsing the file to determine a link for a media file, wherein the link is determined from the string;
following the link to obtain media file metadata for the media file;
validating the media file metadata based on a second specification, wherein the second specification lists requirements for the media file metadata; and
outputting a result based on the validation of the tag metadata and the validation of the media file metadata; and
when the tag metadata and the media file metadata are validated, converting the media file to a format per a third specification of the video delivery system, wherein the creative is eligible for insertion during a break of streaming a main video on the video delivery system.

18. The non-transitory computer-readable storage medium of claim 17, wherein following the link to obtain the media file comprises:
downloading the media file using the link.

19. The non-transitory computer-readable storage medium of claim 17, further operable for:
when the result of the validation of the tag metadata and the validation of the media file metadata is valid, ingesting the media file.

20. An apparatus comprising:
one or more computer processors; and
a non-transitory computer-readable storage medium comprising instructions, that when executed, control the one or more computer processors to be operable for:
receiving a file describing characteristics of a creative for delivery on a video delivery system;
parsing the file to identify a string found in the file, wherein the string is written in a structural language and defines characteristics for the delivery of the creative;
validating tag metadata for a set of tags that define structural elements in the string for the creative based on a first specification, wherein the first specification lists requirements for the tag metadata;
in response to receiving an indication the tag metadata is validated, parsing the file to determine a link for a media file, wherein the link is determined from the string;
following the link to obtain media file metadata for the media file;
validating the media file metadata based on a second specification, wherein the second specification lists requirements for the media file metadata; and
outputting a result based on the validation of the tag metadata and the validation of the media file metadata; and when the tag metadata and the media file metadata are validated, converting the media file to a former per a third specification of the video delivery system, wherein the creative is eligible for insertion during a break of streaming a main video on the video delivery system.

* * * * *